United States Patent
Chae et al.

(10) Patent No.: US 10,178,623 B2
(45) Date of Patent: Jan. 8, 2019

(54) TRANSMITTING APPARATUS FOR BOTH WIRELESS CHARGING AND SHORT RANGE COMMUNICATION

(71) Applicant: LG INNOTEK CO., LTD., Seoul (KR)

(72) Inventors: Yong Suk Chae, Seoul (KR); Soo Young Park, Seoul (KR); Jong Heon Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 43 days.

(21) Appl. No.: 15/327,946

(22) PCT Filed: Jul. 21, 2015

(86) PCT No.: PCT/KR2015/007545
§ 371 (c)(1),
(2) Date: Jan. 20, 2017

(87) PCT Pub. No.: WO2016/013845
PCT Pub. Date: Jan. 28, 2016

(65) Prior Publication Data
US 2017/0201945 A1 Jul. 13, 2017

(30) Foreign Application Priority Data
Jul. 23, 2014 (KR) .................. 10-2014-0093235

(51) Int. Cl.
*H04W 52/02* (2009.01)
*H04W 4/80* (2018.01)
(Continued)

(52) U.S. Cl.
CPC ......... *H04W 52/0258* (2013.01); *H02J 50/12* (2016.02); *H04B 1/02* (2013.01);
(Continued)

(58) Field of Classification Search
CPC ... H04W 52/0258; H04W 4/80; H04W 76/27; H04W 76/046; H04W 4/008; H04B 5/0037; H04B 5/0031
See application file for complete search history.

(56) References Cited

U.S. PATENT DOCUMENTS

2004/0075616 A1* 4/2004 Endo .................. G06K 19/0726
343/895
2007/0060212 A1* 3/2007 Shah .................. H04W 52/028
455/572
(Continued)

FOREIGN PATENT DOCUMENTS

KR 10-2014-0072767 A 6/2014

*Primary Examiner* — Raj Jain
*Assistant Examiner* — Harry H Kim
(74) *Attorney, Agent, or Firm* — Birch, Stewart, Kolasch & Birch, LLP (57) ABSTRACT

Disclosed herein is a transmitting apparatus for both wireless charging and short range communication. According to an embodiment, the transmitting apparatus for both wireless charging and short range communication includes a power transmitter configured to wirelessly transmit power to a power receiver, a communication transmitter configured to wirelessly transmit information to a communication receiver, and a controller configured to control the transmitting apparatus to be selectively switched between a first mode in which the power transmitter is enabled and the communication transmitter is disabled and a second mode in which the communication transmitter is enabled and the power transmitter is disabled. The controller may switch to the first mode when the power receiver is sensed, and may switch to the second mode when the communication receiver is sensed. According to an embodiment of the present invention, a power receiver or a communication receiver is sensed and then a power transmitter or a communication transmitter corresponding thereto is selectively (Continued)

operated so that a communication error that occurs when the power transmitter and the communication transmitter are simultaneously operated is prevented and an unnecessary waste of power is reduced.

16 Claims, 4 Drawing Sheets

(51) Int. Cl.
  *H04W 76/27* (2018.01)
  *H04B 1/02* (2006.01)
  *H04B 5/00* (2006.01)
  *H02J 50/12* (2016.01)
(52) U.S. Cl.
  CPC ......... *H04B 5/0031* (2013.01); *H04B 5/0037* (2013.01); *H04W 4/80* (2018.02); *H04W 76/27* (2018.02); *Y02D 70/144* (2018.01); *Y02D 70/166* (2018.01); *Y02D 70/42* (2018.01)

(56) References Cited

U.S. PATENT DOCUMENTS

| | | | |
|---|---|---|---|
| 2009/0033235 A1* | 2/2009 | Mehta | H05B 39/048 315/194 |
| 2011/0219225 A1* | 9/2011 | Yamazaki | G06F 1/24 713/100 |
| 2012/0056485 A1 | 3/2012 | Haruyama | |
| 2012/0149301 A1* | 6/2012 | Wiley | H04B 5/0031 455/41.1 |
| 2013/0154557 A1 | 6/2013 | Lee et al. | |
| 2014/0021799 A1* | 1/2014 | Sankararamalingam | H04B 5/0037 307/104 |
| 2014/0035521 A1 | 2/2014 | Endo | |
| 2014/0054974 A1* | 2/2014 | Bilbrey | G01R 33/3692 307/104 |
| 2014/0152516 A1 | 6/2014 | Kim et al. | |
| 2014/0184149 A1* | 7/2014 | Jung | H02J 7/025 320/108 |
| 2014/0329467 A1* | 11/2014 | Ewing | H04B 1/3827 455/41.2 |
| 2016/0254705 A1* | 9/2016 | Jung | H02J 50/40 307/104 |

* cited by examiner

TRANSMITTING APPARATUS FOR BOTH WIRELESS CHARGING AND SHORT RANGE COMMUNICATION

CROSS REFERENCE TO RELATED APPLICATIONS

This application is the National Phase of PCT/KR2015/007545 filed on Jul. 21, 2015, which claims priority under 35 U.S.C. § 119(a) to Patent Application No. 10-2014-0093235 filed in the Republic of Korea on Jul. 23, 2014, all of which are hereby expressly incorporated by reference into the present application.

TECHNICAL FIELD

The present invention relates to a transmitting apparatus for both wireless charging and short range communication, and more particularly, to a transmitting apparatus for both magnetic resonance type wireless charging and a near field communication (NFC) type short range communication.

BACKGROUND ART

Among short range communication technologies, near field communication (NFC) is a technology for transmitting and receiving various wireless data over a short distance of within 10 cm using a frequency of 13.56 MHz. Meanwhile, wireless power transmission methods include a magnetic induction type method and a magnetic resonance type method. Particularly, a resonance type wireless power transmission method that complies with the Alliance for Wireless Power (A4WP) standard uses a frequency of 6.78 MHz for transmitting power. Accordingly, when NFC type communication and resonance type wireless power transmission are simultaneously performed, a communication error may occur due to mutual interference caused by a harmonic wave component (a component that is n times greater than a fundamental wave) generated in a frequency band used when NFC type communication and resonance type wireless power transmission are performed.

DISCLOSURE

Technical Problem

The present invention is directed to providing a transmitting apparatus for both wireless charging and short range communication that senses a power receiver or a communication receiver and then selectively operates a power transmitter or a communication transmitter corresponding thereto so that a communication error that occurs when the power transmitter and the communication transmitter are simultaneously operated is prevented and an unnecessary waste of power is reduced.

Technical Solution

According to an embodiment, a transmitting apparatus for both wireless charging and short range communication includes a power transmitter configured to wirelessly transmit power to a power receiver, a communication transmitter configured to wirelessly transmit information to a communication receiver, and a controller configured to control the transmitting apparatus to be selectively switched between a first mode in which the power transmitter is enabled and the communication transmitter is disabled and a second mode in which the communication transmitter is enabled and the power transmitter is disabled.

The controller may switch to the first mode when the power receiver is sensed, and may switch to the second mode when the communication receiver is sensed.

The controller may repeatedly switch between the first mode and the second mode, maintain the first mode when the power receiver is sensed, maintain the second mode when the communication receiver is sensed, and repeatedly switch between the first mode and the second mode again when neither of the power receiver nor the communication receiver is sensed while the first mode or the second mode is maintained.

A cycle at which switching between the first mode and the second mode repeatedly occurs may be 300 milliseconds (ms) or longer.

The power receiver or the communication receiver may be sensed using a protocol between the power transmitter and the power receiver or a protocol between the communication transmitter and the communication receiver.

The power transmitter or the communication transmitter may be enabled or disabled by controlling power supplied to the power transmitter or the communication transmitter.

The power transmitter may transmit the power using a magnetic resonance type method, and the communication transmitter may transmit the information using a near field communication (NFC) type method.

The power transmitter may use a frequency of 6.78 MHz, and the communication transmitter may use a frequency of 13.56 MHz.

The transmitting apparatus for both wireless charging and short range communication may further include a power converter configured to convert power received from a power source and transmit the converted power to the power transmitter.

Advantageous Effects

According to an embodiment of the present invention, a power receiver or a communication receiver is sensed and then a power transmitter or a communication transmitter corresponding thereto is selectively operated so that a communication error that occurs when the power transmitter and the communication transmitter are simultaneously operated is prevented and an unnecessary waste of power is reduced.

MODES OF THE INVENTION

While the present invention may include various embodiments, particular embodiments will be illustrated in the drawings and described. However, the present invention is not limited to particular modes for carrying out the invention, and it should be understood that all modifications that belong to the spirit and technical scope of the present invention belong to the present invention.

Unless defined otherwise, all terms used herein have the same meaning as is commonly understood by one of ordinary skill in the art to which the present invention pertains. Also, terms such as those defined in commonly used dictionaries should be interpreted as having a meaning that is consistent with their meaning in the context of the relevant art and are not to be interpreted in an ideal or overly formal sense.

Terms including ordinals such as first and second may be used to describe various elements, but the elements are not limited by the terms. The terms are only used for the purpose of distinguishing one element from another element. For example, a second element may be referred to as a first element without departing from the scope of the present invention, and likewise, a first element may also be referred to as a second element.

When a certain element is described as being "connected" or "linked" to another element, the certain element may be directly connected or linked to the other element, but yet another element may be understood as existing therebetween. On the other hand, when a certain element is described as being "directly connected" or "directly linked" to another element, yet another element should be understood as not existing therebetween.

Terms used herein are merely used to describe particular embodiments and are not intended to limit the present invention. A singular expression includes a plural expression unless context clearly indicates otherwise. Particularly, terms such as "include" or "have" used herein should be understood as designating that features, number, steps, operations, elements, parts, or combinations thereof exist and not as precluding the existence of or the possibility of adding one or more other features, numbers, steps, operations, elements, parts, or combinations thereof.

Hereinafter, preferred embodiments of the present invention will be described, but descriptions of known configurations irrelevant to the gist of the present invention will be omitted. Meanwhile, in giving reference numerals to elements of each drawing, it should be noted that like reference numerals are given to like elements whenever possible even when like elements are illustrated in different drawings.

Figure 1:
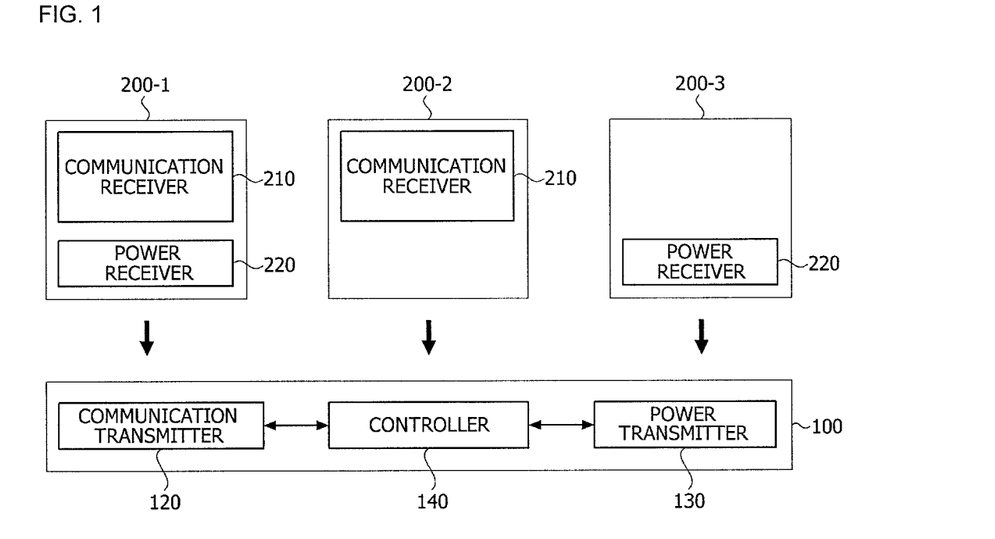
FIG. 1 is a block diagram illustrating a transmitting apparatus for both wireless charging and short range communication and a receiving apparatus corresponding thereto according to an embodiment.

FIG. 1 is a block diagram illustrating a transmitting apparatus for both wireless charging and short range communication and a receiving apparatus corresponding thereto according to an embodiment.

Referring to FIG. 1, a transmitting apparatus 100 for both wireless charging and short range communication according to an embodiment may include a power transmitter 130 configured to wirelessly transmit power to power receivers 220 of a receiving apparatus 200-1 and a receiving apparatus 200-3, a communication transmitter 120 configured to wirelessly transmit information to communication receivers 210 of the receiving apparatus 200-1 and a receiving apparatus 200-2, and a controller 140 configured to control the power transmitter 130 and the communication transmitter 120.

The communication transmitter 120 may wirelessly transmit information to the communication receiver 210 using a near field communication (NFC) type method. NFC is one of radio frequency identification (RFID) technologies and is a non-contact type communication technology for transmitting and receiving various wireless data over a short distance of within 10 cm using a frequency of 13.56 MHz. NFC is a next-generation short range communication technology that is receiving attention due to having relatively excellent security performance and not requiring separate settings between devices unlike a Bluetooth method.

The power transmitter 130 may wirelessly transmit power to the power receiver 220 using a magnetic resonance type method and, particularly, uses a frequency of 6.78 MHz for power transmission when using a resonance type wireless power transmission method that complies with the Alliance for Wireless Power (A4WP) standard. The magnetic resonance type method is a method in which alternating current electromagnetic energy, which resonates in the power transmitter 130 that includes an induction coil and a resonant coil, is received by the power receiver 220 that includes an induction coil and a resonant coil like the power transmitter 130. Here, impedance values and inductor-capacitor (LC) resonance frequencies of the resonant coils of the power transmitter 130 and the power receiver 220 should be matched to each other.

The controller 140 may serve to control the communication transmitter 120, the power transmitter 130, and the like of the transmitting apparatus 100 for both wireless charging and short range communication. Meanwhile, the controller 140 may be configured using a single microcomputer, but the present invention is not limited thereto. Each of the communication transmitter 120 and the power transmitter 130 may include an independent controller. Also, the controller 140 may be configured using a microprocessor unit (MPU), an application processor (AP), a central processing unit (CPU), a digital signal processor (DSP), and the like according to product design.

Here, the controller 140 of the transmitting apparatus 100 for both wireless charging and short range communication may sense the power receivers 220 of the receiving apparatus 200-1 and the receiving apparatus 200-3 using a communication protocol between the power transmitter 130 and the power receiver 220, and may sense the communication receivers 210 of the receiving apparatus 200-1 and the receiving apparatus 200-2 using a communication protocol between the communication transmitter 120 and the communication receiver 210.

Also, the controller 140 may control power supplied to each of the power transmitter 130 or the communication transmitter 120 and enable or disable the power transmitter 130 or the communication transmitter 120. Here, the controller 140 may control power supplied to each of the power transmitter 130 or the communication transmitter 120 by software without a physical switch. For example, the controller 140 may disable the power transmitter 130 or the communication transmitter 120 by decreasing power supplied to the power transmitter 130 or the communication transmitter 120 to be close to 0.

However, the present invention is not limited thereto. According to another embodiment, the controller 140 may enable or disable the power transmitter 130 or the communication transmitter 120 by turning on or off a thyristor, such as a silicon controller rectifier (SCR) and a triode for alternating current (TRIAC), or a transistor, such as a bipolar junction transistor (BJT) and a field effect transistor (FET).

Particularly, the transmitting apparatus 100 for both wireless charging and short range communication may be controlled to repeatedly switch between a first mode in which the power transmitter 130 is enabled and the communication transmitter 120 is disabled and a second mode in which the communication transmitter 120 is enabled and the power transmitter 130 is disabled, maintain the first mode when the power receiver 220 is sensed, and maintain the second mode when the communication receiver 210 is sensed.

Here, when neither of the power receiver 220 nor the communication receiver 210 is sensed while the transmitting apparatus 100 for both wireless charging and short range communication maintains the first mode or the second mode, the transmitting apparatus 100 for both wireless charging and short range communication may be controlled to repeatedly switch between the first mode and the second mode again. Meanwhile, because a certain amount of time is required to sense the power receiver 220 or the communication receiver 210, a cycle in which switching between the first mode and the second mode repeatedly occurs may be preferably set to be 300 ms or longer.

Each of the receiving apparatuses 200-1 to 200-3 includes one or both of the communication receiver 210 and the power receiver 220. Here, the communication receiver 210 may receive information by the NFC type method using the frequency of 13.56 MHz, and the power receiver 220 may receive power by the magnetic resonance type method using the frequency of 6.78 MHz. Meanwhile, each of the receiving apparatuses 200-1 to 200-3 may be a smartphone, a feature phone, a personal digital assistant (PDA), a portable computer, a tablet personal computer (PC), a phablet, i.e., a smartphone that includes a tablet function, and the like.

The transmitting apparatus 100 for both wireless charging and short range communication according to an embodiment is compatible with the receiving apparatus 200-1 including both of the communication receiver 210 and the power receiver 220, the receiving apparatus 200-2 including only the communication receiver 210, and the receiving apparatus 200-3 including only the power receiver 220. Here, when both of the communication receiver 210 and the power receiver 220 of the receiving apparatus 200-1 are enabled, i.e., when both of the communication receiver 210 and the power receiver 220 are sensed, the transmitting apparatus 100 for both wireless charging and short range communication may set which between the communication receiver 210 and the power receiver 220 should have priority. Meanwhile, the transmitting apparatus 100 for both wireless charging and short range communication according to an embodiment may be configured in the form of a pad on which the receiving apparatuses 200-1 to 200-3 may be placed, but the present invention is not limited thereto.

Figure 2:
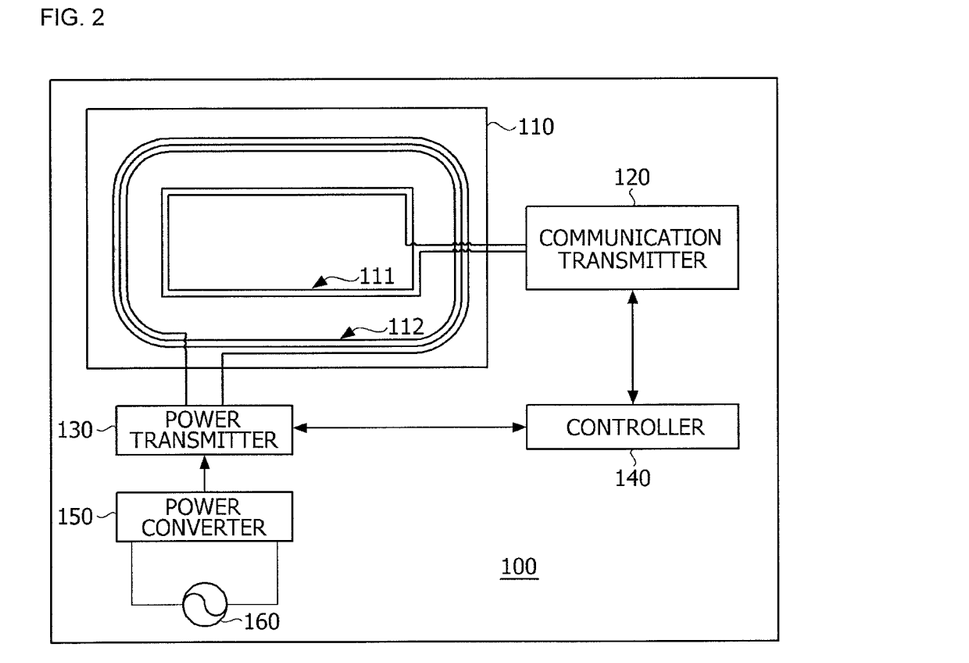
FIG. 2 is a block diagram illustrating a detailed configuration of the transmitting apparatus for both wireless charging and short range communication according to an embodiment.

FIG. 2 is a block diagram illustrating a detailed configuration of the transmitting apparatus for both wireless charging and short range communication according to an embodiment.

Referring to FIG. 2, the transmitting apparatus 100 for both wireless charging and short range communication according to an embodiment may include an antenna unit 110 that includes a short range communication antenna 111 and a wireless charging antenna 112, the communication transmitter 120 configured to wirelessly transmit information to a communication receiver (not illustrated), the power transmitter 130 configured to wirelessly transmit power to a power receiver (not illustrated), the controller 140 configured to control the communication transmitter 120 and the power transmitter 130, and a power converter 150 configured to convert power received from a power source 160 and transmit the converted power to the power transmitter 130.

Here, the short range communication antenna 111 and the wireless charging antenna 112 of the antenna unit 110 may be placed on a soft magnetic shielding member. Meanwhile, although the short range communication antenna 111 is arranged inside the wireless charging antenna 112 in the drawing, the present invention is not limited thereto, and the short range communication antenna 111 may also be arranged outside the wireless charging antenna 112. Also, the power source 160 may supply alternating current power having a predetermined frequency to the power converter 150, and the power converter 150 may serve to convert the alternating current power into a voltage or a current.

Figure 3:
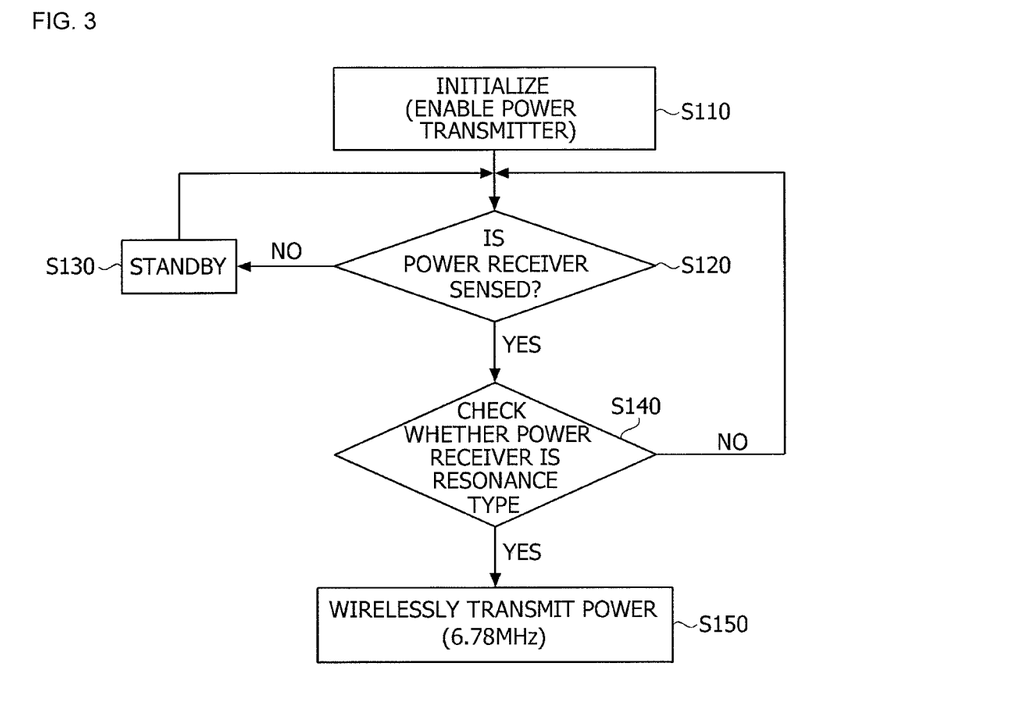
FIGS. 3 and 4 are flowcharts illustrating methods of operating the transmitting apparatus for both wireless charging and short range communication according to comparative examples.
Figure 4:
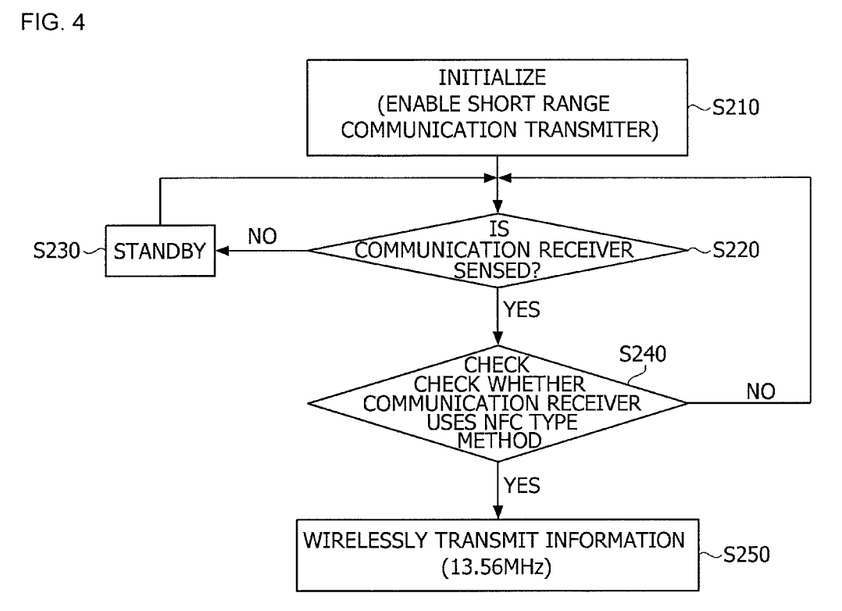

FIGS. 3 and 4 are flowcharts illustrating methods of operating the transmitting apparatus for both wireless charging and short range communication according to comparative examples.

Referring to FIG. 3, a power transmitter of an existing transmitting apparatus for both wireless charging and short range communication is initialized and enabled (S110), and a power receiver that is present within a transmission range of the power transmitter is sensed (S120). Here, the power transmitter may periodically transmit a message and then sense a response signal with respect to the message to check whether the power receiver is present within the transmission range of the power transmitter.

Here, when the power receiver is not sensed, the transmitting apparatus for both wireless charging and short range communication returns from a standby state (S130) to an operation of sensing the power receiver (S120). When the power receiver is sensed, the transmitting apparatus for both wireless charging and short range communication proceeds to determining whether the corresponding power receiver is a resonance type (S140). Then, the transmitting apparatus for both wireless charging and short range communication returns to the operation of sensing the power receiver (S120) when the corresponding power receiver is not the resonance type, and begins wirelessly transmitting power (S150) when the corresponding power receiver is the resonance type.

Referring to FIG. 4, like the power transmitter, the communication transmitter is initialized and enabled (S210), and a communication receiver within a transmission range of the communication transmitter is sensed (S220). Here, the communication transmitter may periodically transmit a message and then sense a response signal with respect to the message to check whether the communication receiver is present within the transmission range of the communication transmitter.

Here, when the communication receiver is not sensed, the transmitting apparatus for both wireless charging and short range communication returns from a standby state (S230) to an operation of sensing the communication receiver (S220). When the communication receiver is sensed, the transmitting apparatus for both wireless charging and short range communication proceeds to determining whether the corresponding communication receiver uses an NFC type method (S240). Then, the transmitting apparatus for both wireless charging and short range communication returns to the operation of sensing the communication receiver (S220) when the corresponding communication receiver does not use the NFC type method, and begins wirelessly transmitting information (S250) when the corresponding communication receiver uses the NFC type method.

Meanwhile, the frequency of 6.78 MHz is used for power transmission by the resonance type wireless power transmission method that complies with the A4WP standard. Because the amount of energy used for resonance type wireless power transmission is relatively large, the power transmission has a great influence on the NFC type communication for transmitting data using a frequency (13.56 MHz) that is two times the frequency used for the power transmission. Consequently, when the power transmitter and the communication transmitter are simultaneously operated, a signal generated by the wireless charging antenna may interfere with a signal generated by the short range communication antenna, and an error may occur in a process in which the communication receiver that is present within the transmission range of the communication transmitter receives data. Thus, it is preferable to stop resonance type wireless power transmission when the transmitting apparatus for both wireless charging and short range communication is performing NFC type communication.

Figure 5:
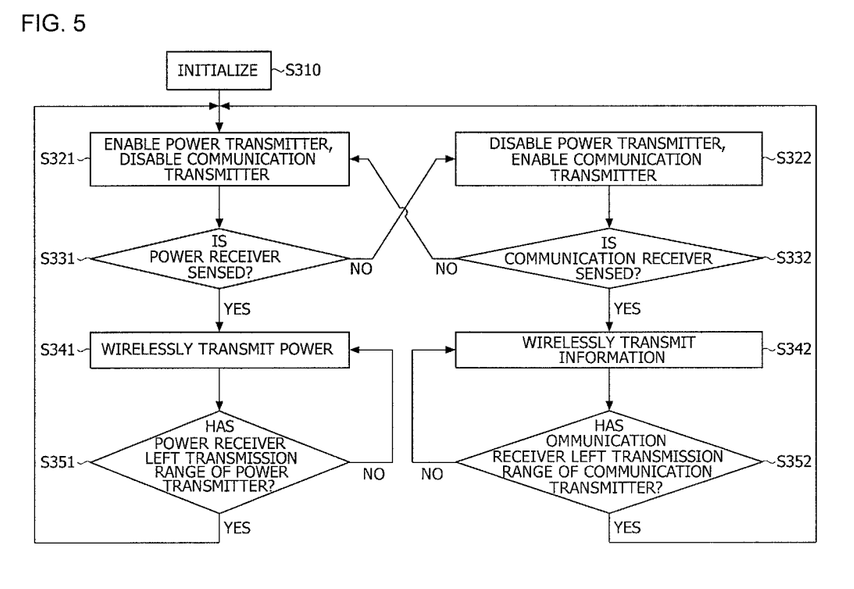
FIG. 5 is a flowchart illustrating a method of operating the transmitting apparatus for both wireless charging and short range communication according to an embodiment.

FIG. 5 is a flowchart illustrating a method of operating the transmitting apparatus for both wireless charging and short range communication according to an embodiment.

Referring to FIG. 5, after the transmitting apparatus for both wireless charging and short range communication according to the embodiment is initialized (S310) and set to be in a first mode in which a power transmitter is enabled and a communication transmitter is disabled (S321), the transmitting apparatus for both wireless charging and short range communication may sense a power receiver within a transmission range of the power transmitter (S331). Here, the power transmitter may periodically transmit a message and then sense a response signal with respect to the message to check whether the power receiver is present within the transmission range of the power transmitter.

Here, the transmitting apparatus for both wireless charging and short range communication may begin wirelessly transmitting power (S341) when the power receiver is sensed, may be set to be in a second mode in which the communication transmitter is enabled and the power transmitter is disabled (S322) when the power receiver is not sensed, and then may sense a communication receiver present within a transmission range of the communication transmitter (S332). Here, the communication transmitter may periodically transmit a message and then sense a response signal with respect to the message to check whether the communication receiver is present within the transmission range of the communication transmitter.

Here, the transmitting apparatus for both wireless charging and short range communication begins wirelessly transmitting information (S342) when the communication receiver is sensed, and returns to be in the first mode (S321) when the communication receiver is not sensed. That is, the transmitting apparatus for both wireless charging and short range communication according to the embodiment may be controlled to repeatedly switch between the first mode (S321) and the second mode (S322) when neither of the power receiver nor the communication receiver is sensed, maintain the first mode (S321) when the power receiver is sensed, and maintain the second mode (S322) when the communication receiver is sensed.

Also, when whether the power receiver has left the transmission range of the power transmitter is checked (S351) during the wireless power transmission (S341), and the power receiver is confirmed to have left as a result, the transmitting apparatus for both wireless charging and short range communication may be controlled to repeatedly switch between the first mode (S321) and the second mode (S322) again. Likewise, when whether the communication receiver has left the transmission range of the communication transmitter is checked (S352) during the wireless information transmission (S342), and the communication receiver is confirmed to have left as a result, the transmitting apparatus for both wireless charging and short range communication may be controlled to repeatedly switch between the first mode (S321) and the second mode (S322) again.

Meanwhile, the transmitting apparatus for both wireless charging and short range communication according to the embodiment may switch between the first mode (S321) and the second mode (S322) in a short cycle of within one second or less. Thus, the transmitting apparatus for both wireless charging and short range communication may also be set to be in the second mode (S322) instead of the first mode (S321) after being initialized (S310).

Figure 6:
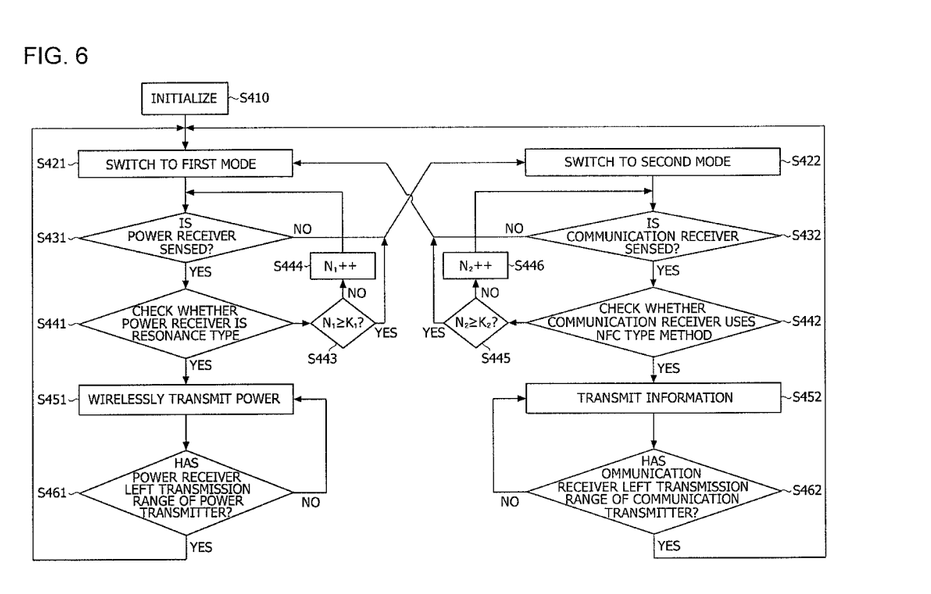
FIG. 6 is another flowchart illustrating a method of operating the transmitting apparatus for both wireless charging and short range communication according to an embodiment.

FIG. 6 is a flowchart illustrating a method of operating a transmitting apparatus for both wireless charging and short range communication according to another embodiment.

Referring to FIG. 6, a transmitting apparatus for both wireless charging and short range communication according to another embodiment may be initialized (S410), may be set to be in a first mode in which a power transmitter is enabled and a communication transmitter is disabled (S421), and then may sense a power receiver present within a transmission range of the power transmitter (S431). Here, the power transmitter may periodically transmit a message and then sense a response signal with respect to the message to check whether the power receiver is present within the transmission range of the power transmitter.

Here, when the power receiver is sensed, the transmitting apparatus for both wireless charging and short range communication determines whether the sensed power receiver is a resonance type (S441). When the sensed power receiver is the resonance type, the transmitting apparatus for both wireless charging and short range communication begins to wirelessly transmit power to the corresponding power receiver (S451). When the sensed power receiver is not the resonance type, the transmitting apparatus for both wireless charging and short range communication repeatedly performs a process of sensing the power receiver (S431) and is switched to a second mode when a power receiver which is not the resonance type is consecutively sensed for a predetermined number of times (S443 to S444).

When the power receiver is not sensed, the transmitting apparatus for both wireless charging and short range communication may be set to be in the second mode in which the communication transmitter is enabled and the power transmitter is disabled (S422), and may sense a communication receiver that is present within a transmission range of the communication transmitter (S432). Here, the communication transmitter may periodically transmit a message and then sense a response signal with respect to the message to check whether the communication receiver is present within the transmission range of the communication transmitter.

Here, when the communication receiver is sensed, the transmitting apparatus for both wireless charging and short range communication determines whether the sensed communication receiver uses an NFC type method (S442). When the sensed communication receiver uses the NFC type method, the transmitting apparatus for both wireless charging and short range communication begins to transmit information to the corresponding communication receiver (S452). When the sensed communication receiver does not use the NFC type method, the transmitting apparatus for both wireless charging and short range communication repeatedly performs a process of sensing the communication receiver (S432) and is switched to the first mode when a communication receiver that does not use the NFC type method is consecutively sensed for a predetermined number of times (S445 to S446).

When the communication receiver is not sensed, the transmitting apparatus for both wireless charging and short range communication returns to the first mode (S421). That is, the transmitting apparatus for both wireless charging and short range communication according to the embodiment may be controlled to repeatedly switch between the first mode (S421) and the second mode (S422) when neither of the power receiver nor the communication receiver is sensed, maintain the first mode (S421) when the power receiver is sensed, and maintain the second mode (S422) when the communication receiver is sensed.

Also, when whether the power receiver has left the transmission range of the power transmitter is checked (S461) during the wireless power transmission (S451), and the power receiver is confirmed to have left as a result, the transmitting apparatus for both wireless charging and short range communication may be controlled to repeatedly switch between the first mode (S421) and the second mode (S422) again. Likewise, when whether the communication receiver has left the transmission range of the communication transmitter is checked (S462) during the wireless information transmission (S452), and the communication receiver is confirmed to have left as a result, the transmitting apparatus for both wireless charging and short range communication may be controlled to repeatedly switch between the first mode (S421) and the second mode (S422) again.

According to the transmitting apparatus for both wireless charging and short range communication according to the embodiment described above, a power receiver or a communication receiver is sensed and then a power transmitter or a communication transmitter corresponding thereto is selectively operated so that a communication error that occurs when the power transmitter and the communication transmitter are simultaneously operated is prevented and an unnecessary waste of power is reduced.

The term "unit" used herein refers to a software element or a hardware element such as an application specific integrated circuit (ASIC) and a field-programmable gate array (FPGA), and the "unit" performs certain roles. However, the "unit" is not limited to software or hardware. The "unit" may be configured to be in an addressable storage medium or may be configured to play one or more processors. Consequently, for example, the "unit" may include elements, such as a software element, an object-oriented software element, a class element, and a task element, a process, a function, an attribute, a procedure, a subroutine, a program code segment, a driver, a firmware, a microcode, a circuit, data, a database, a table, an array, a variable, and the like.

The present invention has been described above with reference to the preferred embodiments of the present invention, but the present invention is not limited thereto. One of ordinary skill in the art to which the present invention pertains should understand that the present invention may be modified and changed in various ways within a scope that does not depart from the technical spirit of the present invention described in the claims below.

DESCRIPTION OF REFERENCE NUMERALS

100: Transmitting apparatus for both wireless charging and short range communication
110: Antenna unit
111: Short range communication antenna
112: Wireless charging antenna
120: Communication transmitter
130: Power transmitter
140: Controller
150: Power converter
160: Power source
200-1 to 200-3: Receiving apparatus
210: Communication receiver
220: Power receiver

The invention claimed is:

1. A transmitting apparatus for both wireless charging and short range communication, the transmitting apparatus comprising:
a power transmitter configured to wirelessly transmit power to a power receiver;
a communication transmitter configured to wirelessly transmit information to a communication receiver; and
a controller configured to control the transmitting apparatus to be selectively switched between a first mode in which the power transmitter is enabled and the communication transmitter is disabled and a second mode in which the communication transmitter is enabled and the power transmitter is disabled,
wherein the controller switches to the first mode when the power receiver is sensed and switches to the second mode when the communication receiver is sensed,
wherein, when the power receiver is sensed, the controller transmits the power to the corresponding power receiver when the power receiver is a resonance type and performs a process of repeatedly sensing a power receiver when the power receiver is not the resonance type, and controls the transmitting apparatus to be switched to the second mode when the power receiver which is not the resonance type is consecutively sensed for a predetermined number of times, and
wherein, when the communication receiver is sensed, the controller transmits information to the corresponding communication receiver when the communication receiver uses a near field communication (NFC) method and performs a process of repeatedly sensing a communication receiver when the communication receiver does not use the NFC type method, and controls the transmitting apparatus to be switched to the first mode when the communication receiver that does not use the NFC type method is consecutively sensed for a predetermined number of times.

2. The transmitting apparatus of claim 1, wherein the transmitting apparatus sets which receiver has priority when both of the communication receiver and the power receiver are sensed.

3. The transmitting apparatus of claim 1, wherein the controller senses the power receiver or the communication receiver through whether a protocol between the power transmitter and the power receiver or between the communication transmitter and the communication receiver is connected.

4. The transmitting apparatus of claim 3, wherein the controller senses the power receiver or the communication receiver through a response signal following a message transmitted to the power receiver or the communication receiver.

5. The transmitting apparatus of claim 4, wherein the controller sets a response signal waiting time with respect to the power receiver and a response signal waiting time with respect to the communication receiver to be different.

6. The transmitting apparatus of claim 1, wherein the controller repeatedly switches between the first mode and the second mode, maintains the first mode when the power receiver is sensed, maintains the second mode when the communication receiver is sensed, and repeatedly switches between the first mode and the second mode again when neither of the power receiver nor the communication receiver is sensed while the first mode or the second mode is maintained.

7. The transmitting apparatus of claim 6, wherein a cycle at which switching between the first mode and the second mode repeatedly occurs is 300 milliseconds (ms) or longer.

8. The transmitting apparatus of claim 1, wherein the power transmitter or the communication transmitter is enabled or disabled by controlling power supplied to the power transmitter or the communication transmitter.

9. The transmitting apparatus of claim 1, wherein the power transmitter transmits the power using a magnetic resonance type method, and the communication transmitter transmits the information using an NFC type method.

10. The transmitting apparatus of claim 1, wherein the power transmitter uses a frequency of 6.78 MHz, and the communication transmitter uses a frequency of 13.56 MHz.

11. The transmitting apparatus of claim 1, further comprising a power converter configured to convert power received from a power source and transmit the converted power to the power transmitter.

12. The transmitting apparatus of claim 1, wherein the controller controls the transmitting apparatus to be selectively switched between the first mode and the second mode by controlling one or more of a silicon controlled rectifier (SCR), a triode for alternating current (TRIAC), a bipolar junction transistor (BJT), and a field effect transistor (FET).

13. The transmitting apparatus of claim 1, further comprising a short range communication antenna connected to the communication transmitter and a wireless charging antenna connected to the power transmitter.

14. The transmitting apparatus of claim 13, wherein the short range communication antenna and the wireless charging antenna are placed on a soft magnetic shielding member.

15. The transmitting apparatus of claim 14, wherein the short range communication antenna is arranged inside the wireless charging antenna.

16. A pad for wireless charging and short range communication, the pad comprising:

a power transmitter configured to wirelessly transmit power to a power receiver;

a communication transmitter configured to wirelessly transmit information to a communication receiver; and a controller configured to control the pad to be selectively switched between a first mode in which the power transmitter is enabled and the communication transmitter is disabled and a second mode in which the communication transmitter is enabled and the power transmitter is disabled, wherein the controller switches to the first mode when the power receiver is sensed and switches to the second mode when the communication receiver is sensed, wherein, when the power receiver is sensed, the controller transmits the power to the corresponding power receiver when the power receiver is a resonance type and performs a process of repeatedly sensing a power receiver when the power receiver is not the resonance type, and controls the transmitting apparatus to be switched to the second mode when the power receiver which is not the resonance type is consecutively sensed for a predetermined number of times, and wherein, when the communication receiver is sensed, the controller transmits information to the corresponding communication receiver when the communication receiver uses a near field communication (NFC) method and performs a process of repeatedly sensing a communication receiver when the communication receiver does not use the NFC type method, and controls the transmitting apparatus to be switched to the first mode when the communication receiver that does not use the NFC type method is consecutively sensed for a predetermined number of times.

* * * * *